United States Patent
O'Donnell et al.

(10) Patent No.: US 8,527,494 B2
(45) Date of Patent: Sep. 3, 2013

(54) TOOLS DISCOVERY IN CLOUD COMPUTING

(75) Inventors: Tony O'Donnell, Kildare Town (IE); Louay Gargoum, Killiney (IE)

(73) Assignee: Business Objects Software Limited, Dublin (IE)

( * ) Notice: Subject to any disclaimer, the term of this patent is extended or adjusted under 35 U.S.C. 154(b) by 171 days.

(21) Appl. No.: 12/901,587

(22) Filed: Oct. 11, 2010

(65) Prior Publication Data

US 2011/0282886 A1 Nov. 17, 2011

Related U.S. Application Data

(60) Provisional application No. 61/334,604, filed on May 14, 2010.

(51) Int. Cl.
*G06F 7/00* (2006.01)

(52) U.S. Cl.
USPC .......................................... 707/708; 707/736

(58) Field of Classification Search
USPC ........................................................ 707/708
See application file for complete search history.

(56) References Cited

U.S. PATENT DOCUMENTS

2004/0221235 A1* 11/2004 Marchisio et al. ............ 715/534
2007/0005686 A1* 1/2007 Fish et al. ..................... 709/203

* cited by examiner

*Primary Examiner* — Amy Ng (57) ABSTRACT

Various embodiments of methods and systems for recommending tools to a user are based on the verbs and nouns in the user request and a context of the user. The method involves receiving a user request, the user request including a search query with one or more keywords, identifying one or more verbs and nouns in the one or more keywords, based on the one or more verbs, nouns and a context of the user executing the search query to obtain list of tools, ranking the list of tools based on the identified nouns and the context of the user and displaying the list of tools.

20 Claims, 5 Drawing Sheets

TOOLS DISCOVERY IN CLOUD COMPUTING

CROSS REFERENCES TO RELATED APPLICATIONS

This application claims the benefit of and priority to U.S. Provisional Patent Application No. U.S. 61/334,604, filed 14 May 2010, titled "TOOLS DISCOVERY IN CLOUD COMPUTING," which is incorporated herein by reference in its entirety.

FIELD

The field generally relates to cloud computing and more specifically to tools discovery in cloud computing.

BACKGROUND

Current web and desktop applications provide a wide variety of rich functionality. Discovering the new functionalities available on the web and within desktop applications may be a challenge for a casual user. The discovery of the new functionalities may involve a search for locating such functionality. The desktop users typically use the help option to search for the new functionalities whereas the web users may use search engines. The challenge of finding the functionalities is multiplied in a cloud computing environment.

Cloud computing is an internet based computing environment where resources are shared across multiple computing systems (i.e., the cloud). Typically, the functionalities available in the cloud computing environment is more than the desktop environment. Among the multiple computing systems, that form the cloud, the ability to interact with several service providers is a challenge. In order to achieve this, the users need tools that provide easy access to the functionalities provided by the service providers. Among several available tools, discovering a tool that suits the user need is a challenge.

In the cloud computing environment, a user may request for a specific functionality by entering a search query. The existing search mechanisms in the cloud computing environment analyzes the search query and matches the search query for exact terms or similar terms. The similar terms may be determined by analyzing the structural meaning of the search term. In the cloud computing environment, the search results returned for the search query of the user is enormous. There is need for receiving accurate results for the search query in the cloud computing environment.

SUMMARY

Various embodiments of systems and methods for tools discovery in cloud computing are described. The process involves receiving a user request, the user request including one or more keywords, identifying one or more verbs and nouns in the one or more keywords, based on the one or more verbs, nouns and a context of the user executing the search query to obtain a list of tools, ranking the list of tools based on the identified nouns and the context of the user and displaying the list of tools.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for tools discovery in cloud computing are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
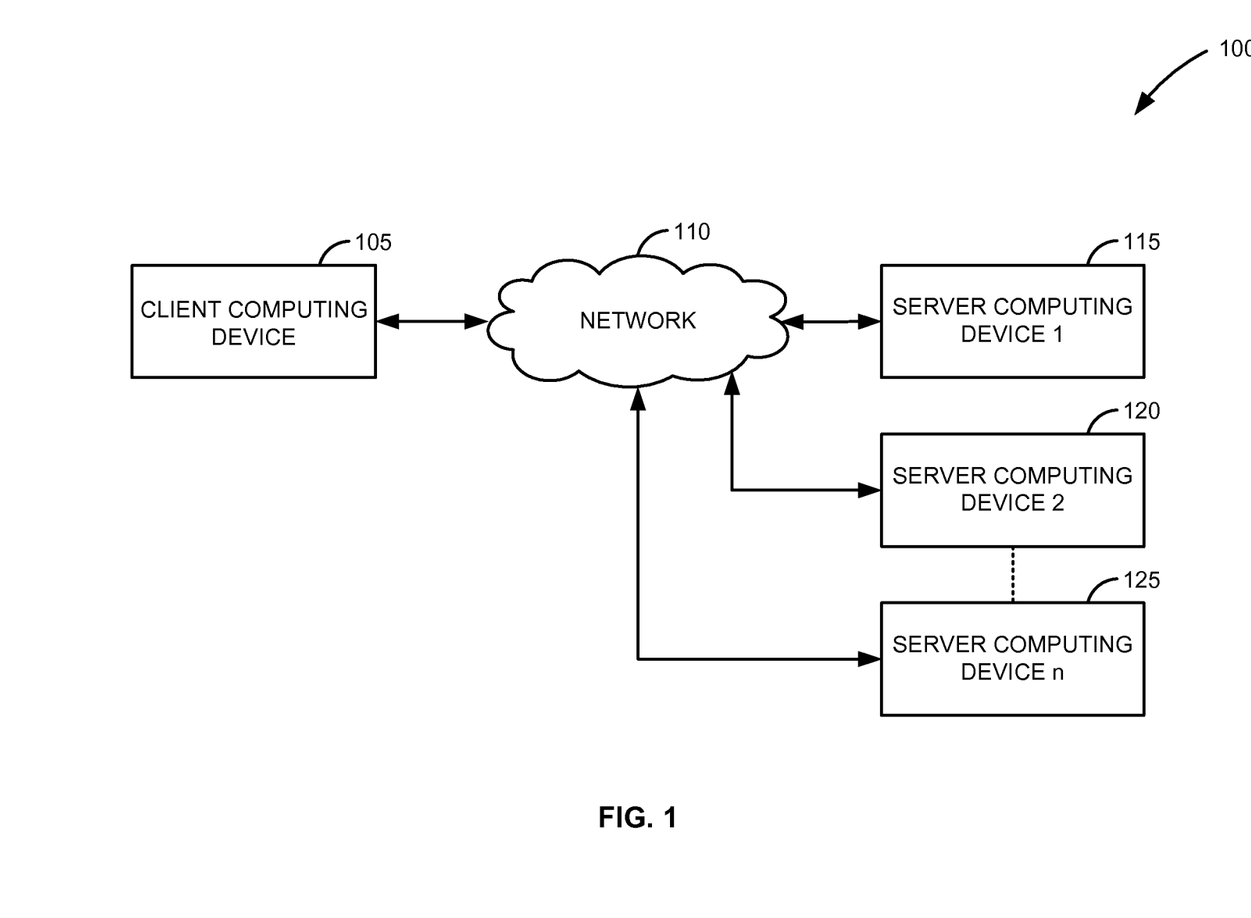
FIG. 1 is a block diagram illustrating a cloud computing environment according to an embodiment.

Cloud computing is an internet based computing environment where the resources are shared among multiple computers. The cloud computing environment includes various service providers. Generally, a service provider is termed as a cloud. The cloud may be referred to as a data centre for serving customers according to their needs. The cloud computing environment includes computing devices operating at various platforms. Discovering new functionalities available through the multiple computers that make up the cloud could be a tedious process. Typically, discovering the new functionalities involves the process of searching for tools associated with the functionality. The functionality discovery is achieved by a search query combined with the context of the user to generate a search query. Consider a business scenario of a user reserving flight tickets along with three colleagues. The search query is "reserve flight tickets at discounted prices in xyz airlines". The search query is analyzed for identifying verbs and nouns. The verbs include action words and nouns represent language associated with a specific function. The verb in this business scenario is "reserve" and the nouns are "flight tickets", "discounted prices" and "xyz airlines". The context of the user is "xyz airlines". For instance, if the user's context includes a reference to a specific airline, the search query for flight booking may refer to the specific airline as opposed to all airlines. The user's context may include but not be limited to type of people, organization, location, resource, event and so on. Based on the verbs, nouns and context of the user in the search query, tools associated with the functionality in the search query are returned. In this business scenario, the tools associated with the functionality of reserving flight tickets are returned. The tools may be but are not limited to flight reservation links, flight availability options of the xyz airlines, discounted flight reservation links of the xyz airlines. The tools are ranked based on the nouns and the context of the user in the search query. In one embodiment, if the search query request does not include a verb, the search results are not returned FIG. 1 is a block diagram illustrating an exemplary cloud computing environment according to an embodiment. The cloud computing environment 100 includes a client computing device 105 and a plurality of server computing devices 115, 120 and 125 provided by different service providers. The resources available in the plurality of servers 115, 120 may be shared upon request. The resources are shared through a network 110. Consider a business scenario of the user requesting for functionality on the client computing device 105. Based on the user request, a tool associated with the requested functionality is searched. The tool is searched based on the verbs, nouns and the context of the user in the user request. The search results are returned in form of a list of tools. The user is able to select one of the tools from the list of tools. Once the user selects a tool from the list of tools, a tool instance is created and the tool instance represents a proxy within the system to the service running on the server computing device. The service may be running on any one of the server computing devices 115, 120 and 125. The proxy manages the creation of a remote instance and the remote instance establishes interaction between the client computing device 105 and the server computing device on which the service is running.

Consider a business scenario of a flight ticket booking for the user and three other colleagues. The service including a tool associated with the functionality of ticket booking is running on any one of the server computing devices in the cloud computing environment. A search may be performed to find the best service running in the cloud computing environment. For instance, if the search query entered by the user is "reserve a flight ticket for me and three other colleagues". The search query is analyzed for verbs and nouns. In this business scenario, user's current context is three other colleagues wanting to make the same booking. In one embodiment, a data object is created for a person. The data object may include information about the person such as first name, last name, passport number and so on. A remote instance creates a proxy for a tool. The remote instance initiates to establish a session between the client computing device and the server computing device. As the server computing devices in the cloud computing environment includes computing devices from various platforms, the proxy maybe used to build a common platform to initiate sessions between the client computing device and server computing device.

Figure 2:
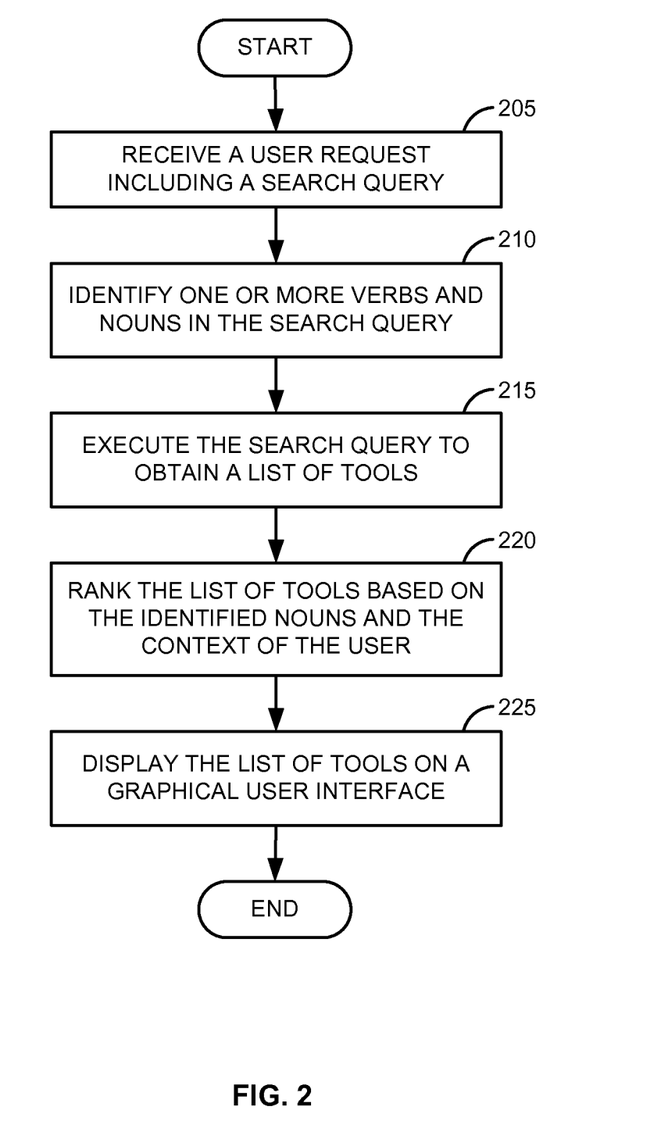
FIG. 2 is a flow diagram illustrating an exemplary method for recommending a tool to a user according to an embodiment.

FIG. 2 is a flow diagram illustrating an exemplary method for recommending tools to a user according to an embodiment. A user request is received at process block 205. The user request includes a search query having one or more keywords. At process block 210, one or more verbs and nouns are identified in the search query. At process block 215, the search query is executed based on the verbs, nouns and a context of the user to obtain a list of tools. A tool has an associated functionality. The context of the user is determined by the user request. The user context may also be determined based on the search items of interest (e.g., people, documents, companies, resources and so on). The user interest is associated with a current activity of the user to determine the context. The context may also be determined by analyzing the application (e.g., document, email and so on) used by the user. At process block 220, the list of tools is ranked based on the identified nouns and the context of the user. At process block 225, the list of tools is displayed on a user interface.

In an embodiment, on selecting one of the tools from the list of the tools obtained, a remote request to the tool is made and when an acknowledgement is received a tools instance is created on the client computing device. The tool instance stores identifier data for the remote instance. The tool instance also uses the handler class specified in the tool definition to manage ongoing interaction with the remote tool. A session is established between the client computing device and the server computing device.

In another embodiment, if verbs are not found in the one or more keywords, a result to the search query is not obtained. In yet another embodiment, the context of the user may be in an arbitrary format. The context in the arbitrary form is mapped to one of the common types to be used as the user context in the search query. The common types include a set of defined attributes. For instance, employee data in a company's database may use an internal format prescribed by the company. However, for that employee data to be used as the context of the user, the employee data is mapped to relevant fields in a "person" type.

Consider a business scenario explaining the process of recommending tools to a user. The user, a regional sales manager, is accessing a word document including product information for the location Ireland. The user requests "review sales performance". The user request is analyzed for verbs and nouns. In this business scenario, "review" is identified as verb and the keywords "sales" and "performance" are identified as nouns. The context of the user is "word document", "regional sales manager" and "Ireland". Based on the verb, nouns and the context of the user, the tools associated with the functionality "review" are returned. The tools are ranked based on the nouns and the context of the user. The tools returned for this business scenario may include but not be limited to month-wise sales performance document, quarterly sales performance document, half yearly sales performance document and yearly sales performance document. In this business scenario, the sales performance document may be stored within the client computing device of the user.

Figure 3:
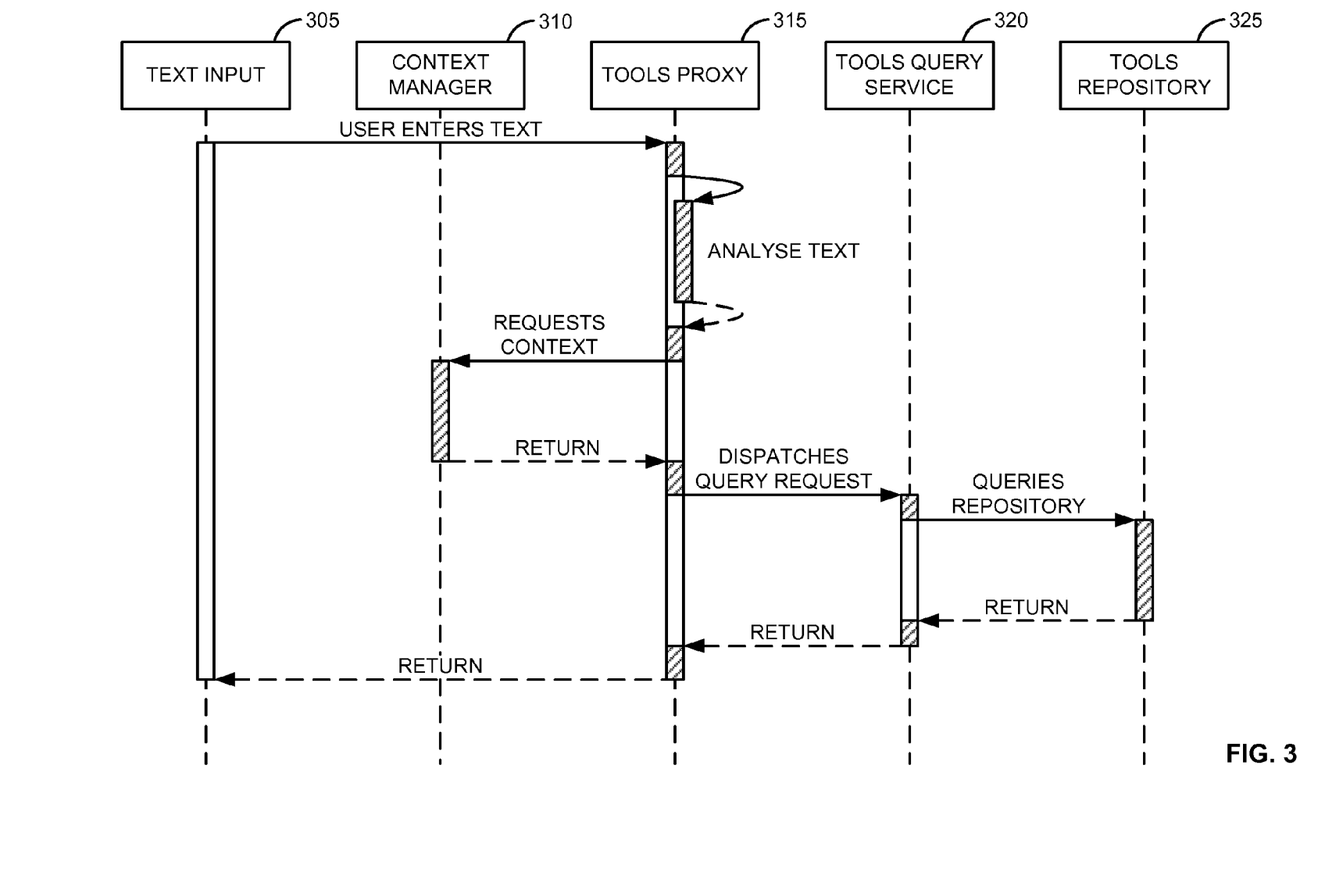
FIG. 3 is a block diagram illustrating an exemplary data flow according to an embodiment.

FIG. 3 is a block diagram illustrating an exemplary data flow according to an embodiment of the invention. The user enters a search query in the user interface as a text input 305 at a client computing device. The text input 305 is "Arrange a sales meeting". The request is sent to a tools proxy 315. The tools proxy 315 analyses the text input for verbs and nouns with the context of the user. The tools proxy 315 requests the context of the user from a context manager 310. The context of the user is determined by the user request. The context of the user is forwarded to the tools proxy 315. The tools proxy 315 generates a search query. The tools proxy 315 sends the search query to a tools query service 320 on a server computing device. The tools query service 320 queries a tools repository 325 for a list of tools. The list of the tools is returned to the user.

Figure 4:
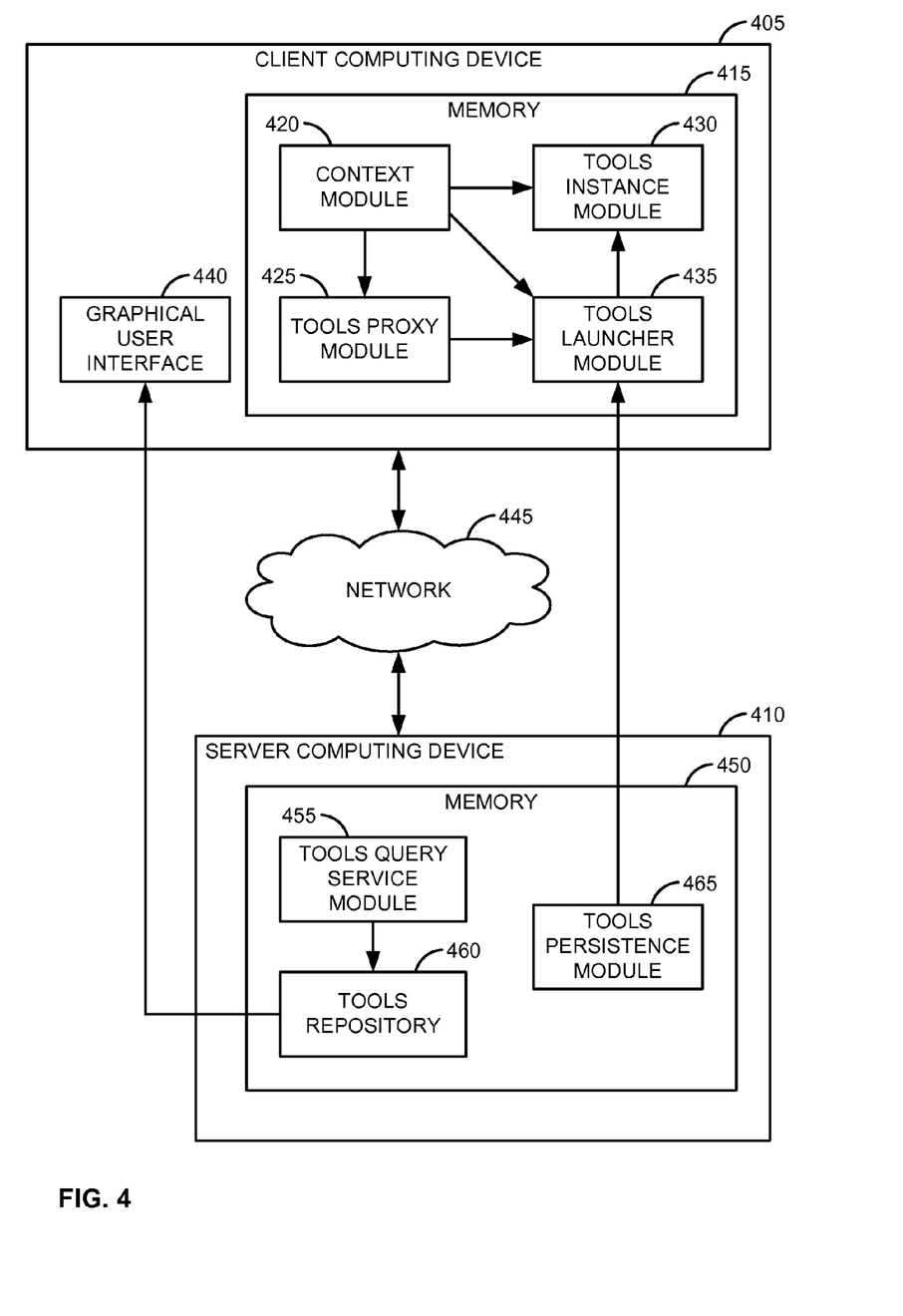
FIG. 4 is a block diagram illustrating an exemplary system for recommending a tool to a user according to an embodiment.

FIG. 4 is a block diagram illustrating an exemplary computer system for recommending a tool according to an embodiment. The computer system includes a client computing device 405 and a server computing device 410. The client computing device 405 and the server computing device 410 are connected through a network 445. The memory 415 of the client computing device 405 includes a context module 420, a tools proxy module 425, a tools instance module 430 and a tools launcher module 435. A processor (not shown) in communication with the memory 415 includes instructions for the context module 420, a tools proxy module 425, a tools instance module 430 and a tools launcher module 435 to perform required operations. The client computing device 405 includes a graphical user interface 440. The memory 450 of the server computing device 410 includes a tools query service module 455, a tools repository 460 and a tools persistence module 465.

The graphical user interface 440 receives a search query in form of a text input. The user inputs the search query in a text input region in the graphical user interface 440. The text input is sent to the tools proxy module 425. The tools proxy module 425 analyses the text input to identify verbs and nouns in the text input. The tools proxy module 425 requests the context of the user from the context module 420. The context of the user is determined by the text input entered by the user. The context may also be determined based on the type of application being used by the user. The search query for a tool is generated by the tools proxy module 425 based on the identified verbs, nouns and the context of the user. The search query is sent to the tools query service module 455. The tools query service module 455 is stored in the memory 450 of the server computing device 410. The tools query service module 455 processes the search query and requests the tools repository 460 for a list of tools in response to the search query. The tools repository 460 stores plurality of tools. The tools repository 460 stores a set of XML definitions and code libraries for the tools that are available. The graphical user interface 440 displays the list of tools.

In an embodiment, the user selects one of the tools from the list of the tools obtained. Based on the selection, the tools launcher module 435 retrieves a tool handler class from the tools definition in the tools repository 460 and dynamically loads a user interface (UI) associated with the tool. The tools launcher module 435 also makes a remote request for the tool. An instance is created on the client computing device 405. The instance is a proxy for the remote tool in the cloud computing environment. The instance is created by the tools instance module 430. The tools instance module 430 is a user interface (UI) component representing an instantiated tool. The tool instance uses the handler class specified in the tool definition to manage ongoing interaction with the remote tool. The handler is an attribute providing a reference to the library class that is used to instantiate and manage the lifecycle of the tool instance. The instance data may be persisted back to the server computing device 410 by the tools persistence module 465 between the sessions of the server computing device 410 and the client computing device 405.

In an embodiment, new tools are added into the tools repository 460. Adding the new tools into the tools repository involves the process of publishing a bundled set of resources and an Extensible Markup Language (XML) descriptor for the tool.

In another embodiment, the tool instance module 430 manages the passing of data to the proxy service, provides standardized updates from the remote service, provides status messages on the state of the remote service, provides a navigable link to the remote service instance and encapsulates any business logic that assists with the interaction with the third remote service.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 5:
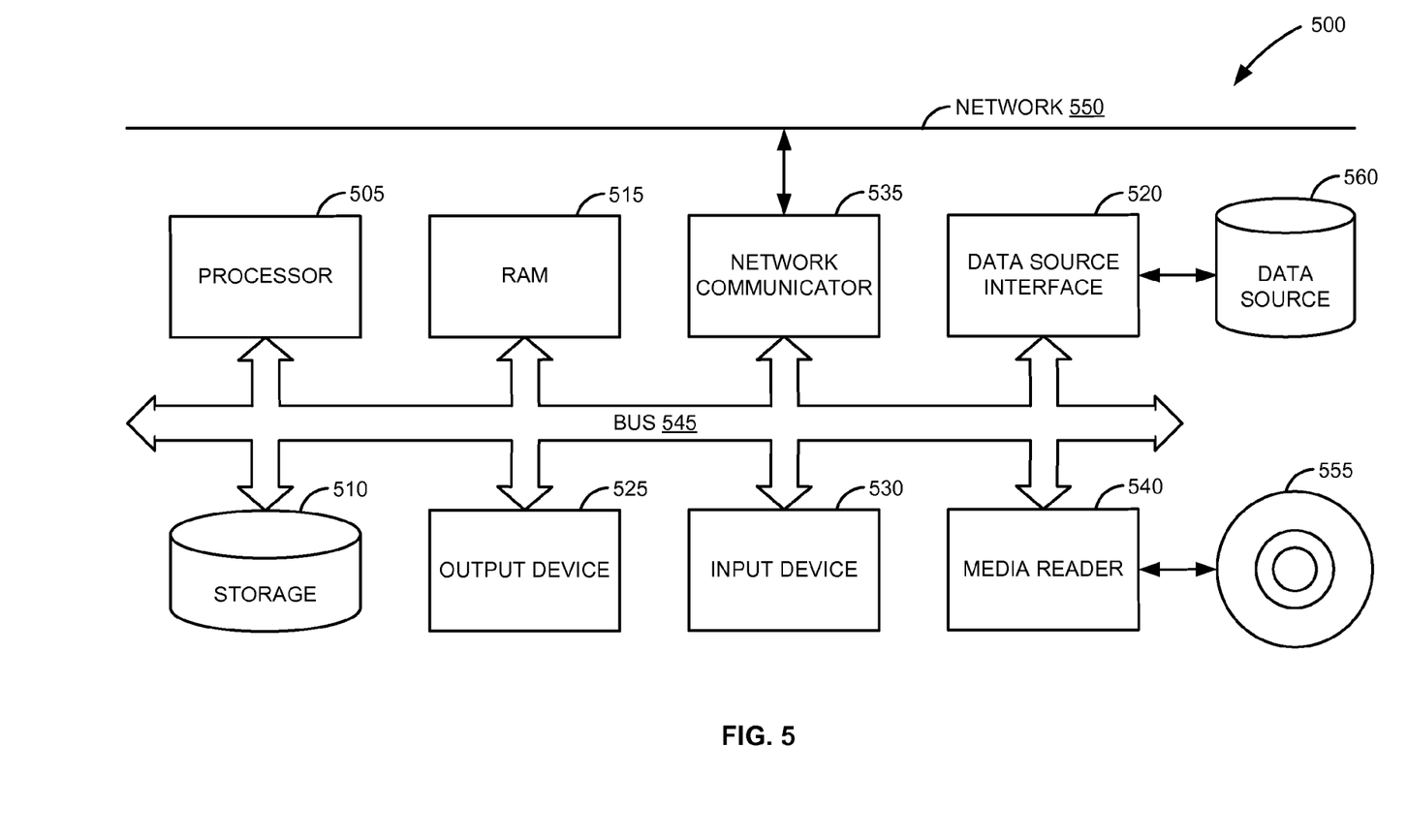
FIG. 5 is a block diagram of an exemplary computer system according an embodiment.

FIG. 5 is a block diagram of an exemplary computer system 500 according an embodiment. The computer system 500 includes a processor 505 that executes software instructions or code stored on a computer readable storage medium 555 to perform the above-illustrated methods of the invention. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment of the invention, the computer system 500 further includes an output device 525 (e.g., a display) to provide at least some of the results of the execution as output including, but not limited to, visual information to users and an input device 530 to provide a user or another device with means for entering data and/or otherwise interacting with the computer system 500.

Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   receive a user request at a client computing device, the user request comprising a search query with one or more keywords;
   identify one or more verbs and nouns in the search query;
   based on the identified one or more verbs and nouns and a context of the user, execute the search query at one or more server computing devices to obtain a list of tools, wherein each tool is included in a corresponding service running in the one or more server computing devices and the list of tools are associated with one or more functionalities;
   based on the identified nouns and the context of the user, rank the list of the tools;
   display the ranked list of tools on a user interface;
   receive a selection of a tool from the displayed list of tools; and
   create a tool instance corresponding to the selected tool, wherein the tool instance represents a proxy to a service including the selected tool and a handler in the tool instance manages ongoing interaction with the selected tool and provides a reference to a library class that manages the lifecycle of the created tool instance.

2. The article of manufacture in claim 1, wherein the context of the user is determined by the user request.

3. The article of manufacture in claim 1, wherein the instructions to execute the search query further comprise instructions to: retrieve one or more tools from a repository of the server computing device.

4. The article of manufacture in claim 1, wherein the instructions to display the list of tools on the user interface further comprise instructions to:
   provide an option for selecting at least one tool from the displayed list of tools.

5. The article of manufacture in claim 4, wherein the instructions to create the tool instance further comprise instructions to:
   create the tool instance at the client computing device, wherein the proxy provides a common platform for establishing a session between the client computing device and the server computing device.

6. The article of manufacture in claim 1, wherein the instructions to select the tool, further comprise instructions to:
   dynamically load a user interface associated with the tool, wherein the user interface includes a business logic corresponding to the selected tool.

7. The article of manufacture in claim 1, further comprising instructions which when executed by the computer further cause the compute to:
   receive a status message on a state of the service running.

8. A computer-implemented method for recommending a tool associated with a functionality, the method comprising:
   receiving a user request at a client computing device, the user request comprising a search query with one or more keywords;
   identifying one or more verbs and nouns in the search query;
   based on the identified one or more verbs and nouns and a context of the user, executing the search query at one or more server computing devices to obtain a list of tools, wherein each tool is included in a corresponding service running in the one or more server computing devices and the list of tools are associated with one or more functionalities;

based on the identified nouns and the context of the user, ranking the list of tools;

displaying the ranked list of tools on a graphical user interface;

receiving a selection of a tool from the displayed list of tools; and creating a tool instance corresponding to the selected tool, wherein the tool instance represents a proxy to a service including the selected tool and a handler in the tool instance manages ongoing interaction with the selected tool and provides a reference to a library class that manages the lifecycle of the created tool instance.

9. The computer-implemented method of claim 8, wherein the context of the user is determined by the user request.

10. The computer-implemented method of claim 8, wherein executing the search query further comprises:
retrieving one or more tools from a repository of the server computing device.

11. The computer-implemented method of claim 8, wherein displaying the list of tools on the user interface further comprises:
providing an option for selecting at least one tool from the displayed list of tools.

12. The computer-implemented method of claim 11, wherein creating the tool instance further comprises:
creating the tool instance at the client computing device, wherein the proxy provides a common platform for establishing a session between the client computing device and the server computing device.

13. The computer-implemented method of claim 8, the instructions further comprise:
receiving a status message on a state of the service running.

14. The computer-implemented method of claim 8, wherein the instructions to selecting the tool, further comprise instructions to:
dynamically loading a user interface associated with the tool, wherein the user interface includes a business logic corresponding to the selected tool.

15. A computer system for recommending a tool associated with a functionality, comprising:
a computer memory to store program code; and
a processor to execute the program code to:
receive a user request at a client computing device, the user request comprising a search query with one or more keywords;
identify one or more verbs and nouns in the search query;
based on the identified one or more verbs and nouns and a context of the user, execute the search query at one or more server computing devices to obtain a list of tools, wherein each tool is included in a corresponding service running in the one or more server computing devices and the list of tools are associated with one or more functionalities;
based on the identified nouns and the context of the user, rank the list of tools;
display the ranked list of tools on a graphical user interface;
receive a selection of a tool from the displayed list of tools; and
create a tool instance corresponding to the selected tool, wherein the tool instance represents a proxy to a service including the selected tool and a handler in the tool instance manages ongoing interaction with the selected tool and provides a reference to a library class that manages the lifecycle of the created tool instance.

16. The system of claim 15, wherein the context of the user is determined by the user request.

17. The system of claim 15, wherein the program code to execute the search query, further comprises program code to:
retrieve one or more tools from a repository of the server computing device.

18. The system of claim 15, wherein the program code to display the list of tools on the user interface, further comprises program code to:
provide an option for selecting at least one tool from the displayed list of tools.

19. The system of claim 18, wherein the program code to create the tool instance, further comprise program code to:
create the tool instance at the client computing device, wherein the proxy provides a common platform for establishing a session between the client computing device and the server computing device.

20. The system of claim 15, wherein the program code further comprises:
receive a status message on a state of the service running.

* * * * *